US010620633B2

(12) United States Patent
Yamamoto et al.

(10) Patent No.: US 10,620,633 B2
(45) Date of Patent: Apr. 14, 2020

(54) AUTONOMOUS MOBILE SYSTEM

(71) Applicant: Hitachi, Ltd., Chiyoda-ku, Tokyo (JP)

(72) Inventors: Kenjiro Yamamoto, Tokyo (JP); Ryoko Ichinose, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 15/029,375

(22) PCT Filed: Nov. 5, 2013

(86) PCT No.: PCT/JP2013/079808
§ 371 (c)(1),
(2) Date: Apr. 14, 2016

(87) PCT Pub. No.: WO2015/068193
PCT Pub. Date: May 14, 2015

(65) Prior Publication Data
US 2016/0224027 A1 Aug. 4, 2016

(51) Int. Cl.
G05D 1/02 (2020.01)
B62D 15/02 (2006.01)
B60W 30/09 (2012.01)
B60W 40/04 (2006.01)
B60W 30/095 (2012.01)
G05D 1/00 (2006.01)

(52) U.S. Cl.
CPC .......... *G05D 1/0212* (2013.01); *B60W 30/09* (2013.01); *B60W 30/0956* (2013.01);
(Continued)

(58) Field of Classification Search
CPC ... G05D 1/0212; G05D 1/0088; B60W 30/09; B60W 30/0956; B60W 40/04; B62D 15/025
See application file for complete search history.

(56) References Cited

U.S. PATENT DOCUMENTS 6,681,157 B2 * 1/2004 Kageyama ............ B60W 40/04
701/1
2005/0275717 A1* 12/2005 Camus ................. H04N 13/275
348/42
(Continued)

FOREIGN PATENT DOCUMENTS

JP 2008-152599 A 7/2008
JP 2008-152600 A 7/2008
JP 2010-55496 A 3/2010

OTHER PUBLICATIONS

International Search Report (PCT/ISA/210) issued in PCT Application No. PCT/JP2013/079808 dated Jan. 28, 2014 with English translation (Four (4) pages).
(Continued)

Primary Examiner — Thomas E Worden
(74) Attorney, Agent, or Firm — Crowell & Moring LLP

(57) ABSTRACT

The present invention addresses the problem of achieving an autonomous mobile system that is provided with a means for safe two-way traffic or overtaking if the crossing or approach of travel paths arises with respect to another party such as a pedestrian, bicycle or the like during autonomous travel over a designated reference path in an environment in which mobile obstacles such as pedestrians, bicycles and the like moving in free directions are present in public or in a facility. To solve this problem, in the present invention, it is necessary before an approach to induce circumstances such that mutual motion is defined and to obtain defining information of the movement of the other party, thereby maintaining uniform circumstances when passing nearby such that no large changes in course are performed. Consequently, if the crossing or approach of travel paths arises with respect to another party such as a pedestrian, bicycle or the like, the autonomous mobile system behaves in a manner easy to predict by the other party in order to induce circumstances (Continued)

such that the movement of the other party is defined, and after obtaining the defining information of the movement of the other party, maintains uniform circumstances when passing nearby such that no large changes in course are performed, thereby achieving safe and secure two-way traffic and overtaking.

4 Claims, 3 Drawing Sheets

(52) U.S. Cl.
CPC ........... *B60W 40/04* (2013.01); *B62D 15/025* (2013.01); *G05D 1/0088* (2013.01); *G05D 2201/0213* (2013.01)

(56) References Cited

U.S. PATENT DOCUMENTS

| | | | | |
|---|---|---|---|---|
| 2008/0162010 A1* | 7/2008 | Klotz | ................. | B60K 31/0008 701/93 |
| 2010/0114490 A1* | 5/2010 | Becker | ................. | B60W 30/16 701/301 |
| 2013/0099911 A1* | 4/2013 | Mudalige | ............... | G08G 1/163 340/438 |
| 2014/0180526 A1* | 6/2014 | Deshpande | .......... | G05D 1/0248 701/25 |
| 2015/0057891 A1* | 2/2015 | Mudalige | .............. | B60W 10/00 701/42 |
| 2015/0291216 A1* | 10/2015 | Sato | ....................... | B60W 50/14 701/23 |
| 2016/0224027 A1* | 8/2016 | Yamamoto | ............ | B60W 30/09 |
| 2017/0253241 A1* | 9/2017 | Filev | ................. | B60W 50/0097 |
| 2018/0170429 A1* | 6/2018 | Shimizu | ................... | B62D 6/00 |
| 2018/0233048 A1* | 8/2018 | Andersson | ......... | G06K 9/00805 |

OTHER PUBLICATIONS

Hara, Y., et al., "Development of Autonomous Navigation Technology Adapted to Crowded Pedestrian Streets and Evaluations in Real World Using Experimental Robot Sofara-T", Journal of the Robotics Society of Japan, Apr. 15, 2012, vol. 30, No. 3, pp. 55-63 with English-language abstract (Nine (9) pages).

* cited by examiner

AUTONOMOUS MOBILE SYSTEM

TECHNICAL FIELD

The present invention relates to an autonomous mobile system that autonomously travels over a designated reference path in an environment in which a mobile obstacle, such as a pedestrian or a bicycle that moves, is present in a facility or in public.

BACKGROUND ART

As the background art of the present technical field, PTL 1 has been disclosed. In the publication, an object is to provide an autonomous mobile object creating a travel path for moving autonomously while avoiding a collision with the mobile obstacle. Therefore, the following method and system have been disclosed. Based on current position information and travel direction information of the mobile obstacle, a travel prediction path of the mobile obstacle is calculated. A restricted region is set around a future position of the mobile obstacle at a point in time at which the autonomous mobile object arrives at an intersection between the travel prediction path of the mobile obstacle and the travel path of the autonomous mobile object. The larger a distance between the current position of the autonomous mobile object and the future position of the mobile obstacle, is, the smaller the restricted region is set. The travel path of the autonomous mobile object is created so as to avoid the restricted region.

PTL 2 discloses a travel path creating method and a system including the following. A size of the restricted region around the mobile obstacle disclosed in PTL 1 is set so as to be small as a relative distance between the mobile obstacle and the autonomous mobile object increases. The size of the restricted region is set so as to be large as a speed of the autonomous mobile object increases.

CITATION LIST

Patent Literature

PTL 1: Japanese Patent Application Laid-Open No. 2008-152600
PTL 2: Japanese Patent Application Laid-Open No. 2008-152599

SUMMARY OF INVENTION

Technical Problem

An object of the present invention is to provide an autonomous mobile system including a unit for performing secure two-way traffic or overtaking traffic in a case where crossing or approach of an autonomous mobile system's path occurs with respect to a travel path of another party, such as a pedestrian, a bicycle, or the like, referred to herein as a mobile obstacle, upon autonomous travel of the autonomous mobile system over a designated reference path in an environment in which the mobile obstacle is present in a facility or in public.

The system in PTL 1 predicts the future position of the mobile obstacle based on the current position information and the travel direction information of the mobile obstacle, and changes the path of the autonomous mobile object. Thus, in a case where the mobile obstacle includes a plurality of pedestrians or bicycles, when one of them changes a travel speed and a travel direction in an instant, the autonomous mobile object changes its path. Therefore, there are the following problems. A sudden change in the path or a frequent change in the path of the autonomous mobile object occurs. The pedestrians or the bicycles cannot predict a movement of the autonomous mobile object. The pedestrians or the bicycles also change their paths. Secure/safe two-way traffic and overtaking traffic cannot be achieved.

In the system in PTL 2, the size of the restricted region around the mobile obstacle is set so as to be small as the relative distance between the mobile obstacle and the autonomous mobile object increases. The size of the restricted region is set so as to be large as the speed of the autonomous mobile object increases. Thus, an effect of the distant mobile obstacle becomes small. However, an avoidance width increases as the mobile obstacle comes close and the speed of the autonomous mobile object increases. Thus, a large change in direction is required. Therefore, there is a case where a large change in path occurs when the autonomous mobile object is close to the mobile obstacle, and there is a problem that secure two-way traffic and overtaking traffic cannot be achieved.

In contrast, the present invention has been made in order to solve the above conventional problems. An object of the present invention is to provide an autonomous mobile system capable of achieving secure two-way traffic and overtaking traffic with respect to a mobile obstacle, such as a pedestrian or a bicycle that moves in a free direction.

Solution to Problem

In order to solve the above problems, according to the present invention, an autonomous mobile system is configured to autonomously move based on a designated reference path in an environment in which an obstacle, such as the mobile obstacle, is present. The autonomous mobile system includes: an environment information acquisition unit configured to acquire environment information of circumstances; a storage information processing unit configured to retain the reference path information or geographic information in which the reference path has been registered; a self-position estimation unit configured to estimate a self-position of the autonomous mobile system based on the environment information and the reference path information or the geographic information; an obstacle information generating unit configured to generate information of an obstacle preventing the movement of the autonomous mobile system, based on the environment information; a path determining unit configured to determine a planning path or a planning direction, and a planning speed based on the self-position, the obstacle information, and the reference path information; an approach movement generating unit configured to determine a target path, a target direction, or a target speed of approach travel for inducing stable circumstances in which mutual movements have been previously defined, in a case where the mobile obstacle approaches based on the obstacle information; and a vehicle control unit configured to control the movement of the autonomous mobile system based on the target direction and the target speed. The approach movement generating unit detects approach of the mobile obstacle and the autonomous mobile system, determines types of approach circumstances based on the obstacle information of the mobile obstacle, the current self-position of the autonomous mobile system, and the planning path, determines a prediction-facilitating movement in which the movement of the autonomous mobile system is easily predicted by the mobile obstacle, based on the types of approach circumstances, determines path definition of the mobile obstacle based on a certain movement of the mobile obstacle during a certain period during the prediction-facilitating movement, and corrects the target path of the autonomous mobile system so that the movement of the mobile obstacle is not prevented, based on the defined travel path of the mobile obstacle.

Further, in the autonomous mobile system according to the present invention, the prediction-facilitating movement is used to generate a rectangular area through which the target path of the autonomous mobile system follows (hereinafter referred to as a section) and the target speed based on circumstances of the environment, an approach position, and the types of approach circumstances, and travels at a constant speed in the generated rectangular section.

Still further, in the autonomous mobile system according to the present invention, the types of approach circumstances include any of two-way travel, crossing, overtaking, and catching-up, and the prediction-facilitating movement is used to weight selection of the section, the target speed and the target path in response to the types.

Another still further, in the autonomous mobile system according to the present invention, the mobile obstacle is a pedestrian or a bicycle, and the obstacle information generating unit generates identifiable information.

Advantageous Effects of Invention

According to the present invention, an autonomous mobile system capable of performing secure two-way traffic and overtaking traffic with respect to a mobile obstacle, such as a pedestrian or a bicycle that moves, can be provided

DESCRIPTION OF EMBODIMENTS

An exemplary autonomous mobile system according to a preferred embodiment of the present invention, will be described below based on the drawings.

According to the present embodiment, an example of the autonomous mobile system including an approach movement generating unit, will be described. In order to perform secure/safe two-way travel and overtaking travel in a case where crossing or approach of an autonomous mobile system's path occurs with respect to a travel path of a mobile obstacle, such as a pedestrian or a bicycle, upon autonomous travel over a designated reference path in an environment in which the mobile obstacle which moves in a free direction, is present in a facility or in public, the approach movement generating unit behaves so as to be easily predicted by the mobile obstacle in order to induce circumstances in which a movement of the mobile obstacle has been defined. After acquiring definition information of the movement of the mobile obstacle, the approach movement generating unit maintains uniform circumstances when passing nearby so that no large change in the their paths is performed. Note that, the present invention is suitable to the environment in which the mobile obstacle, such as a pedestrian or a bicycle, is present. The present invention can be also applied to an environment in which a mobile obstacle, such as a motor vehicle or a carrier, operated by a person, and another autonomous mobile system are present.

Figure 1:
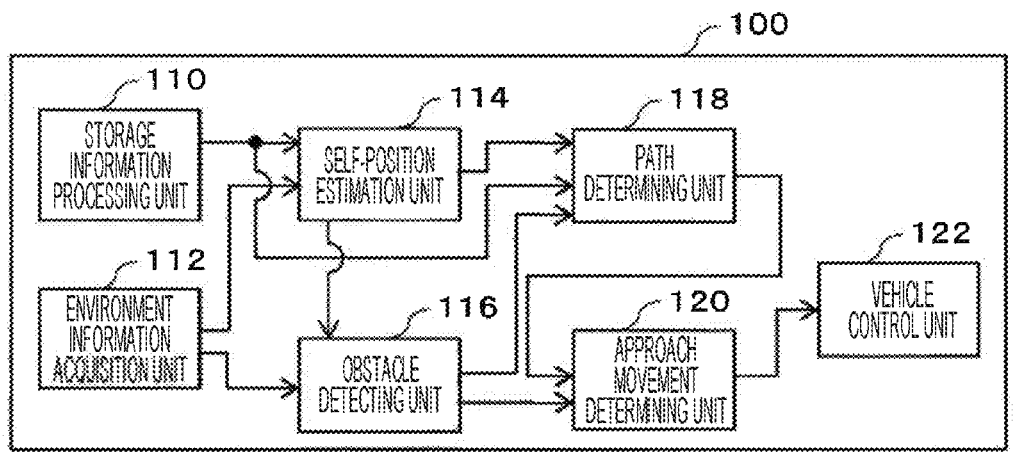
FIG. 1 is a diagram of a system configuration of an autonomous mobile system according to one embodiment of the present invention.

FIG. 1 is a diagram of a configuration of the autonomous mobile system according to the present embodiment. The detailed descriptions will be given below using reference signs.

The autonomous mobile system 100 includes a storage information processing unit 110, an environment information acquisition unit 112, a self-position estimation unit 114, an obstacle detecting unit 116, a path determining unit 118, the approach movement generating unit 120, and a vehicle control unit 122. Note that, not illustrated, a configuration in which each of the above units is performed on a computer equipped in the autonomous mobile system 100, can be provided. Alternatively, a configuration in which processing of a part or all of the units is performed on an external computer through wireless communication, can be provided. The autonomous mobile system according to the present embodiment, will be described below as a configuration in which the autonomous mobile system moves using wheels.

The storage information processing unit 110 retains the reference path over which at least the autonomous mobile system 100 travels, and geographic information on the periphery of the reference path. The storage information processing unit 110 transmits the geographic information on the periphery of the reference path to the self-position estimation unit 114, and transmits the reference path to the path determining unit 118.

The environment information acquisition unit 112 includes a sensor equipped in the autonomous mobile system 100, and acquires information from the sensor. The detail of the sensor is not illustrated. The sensor includes a laser-typed distance sensor, a camera (for example, a stereo camera system having a configuration in which two cameras are arranged side by side so as to be capable of measuring a distance), an angular velocity sensor, an acceleration sensor, a magnetic sensor, a GPS receiver, a wheel rotational quantity sensor, and the like. Pieces of sensor information acquired by the sensors are transmitted to the self-position estimation unit 114 and the obstacle detecting unit 116 to be described later.

The self-position estimation unit 114 specifies a current self-position of the autonomous mobile system 100 based on the pieces of the sensor information acquired by the respective sensors. For example, in detail, the self-position information created by accumulating a value of the wheel rotational quantity sensor (referred to as an odometry), a correction of the odometry by the angular velocity sensor, the acceleration sensor, and the magnetic sensor, the self-position information acquired by associating the sensor information from the laser-typed distance sensor and the camera with the geographic information acquired from the storage information processing unit 110, and position information acquired from the GPS receiver, are stochastically merged (for example, by adopting a method referred to as an extended Kalman filter) so that accurate self-position and direction as the self-position information are estimated in a region in which the autonomous mobile system 100 moves on the geographic information or the reference path. The self-position information that has been finally acquired is transmitted to the obstacle detecting unit 116 and the path determining unit 118 to be described later.

Based on the pieces of the sensor information, the obstacle detecting unit 116 detects a region to be an obstacle with respect to a movement of the autonomous mobile system 100, and calculates obstacle information. For example, in detail, examples of the obstacle as a stationary obstacle include a step having a height over which the autonomous mobile system 100 cannot cross, a large groove, a protruding portion in the air, or the like, in peripheral shape information acquired from the laser-typed sensor and the camera (for example, a stereo camera system having a configuration in which two cameras are arranged side by side stereo so as to be capable of measuring a distance). The obstacle as the mobile obstacle, such as a pedestrian or a bicycle (in some cases, a motor vehicle) that moves and is present in an environment, such as in a facility or in public, is also detected. In particular, the pedestrian or the bicycle (in some cases, the motor vehicle) is specified by using, for example, image processing. The obstacle information on the mobile obstacle that moves, includes a size (width), a speed, a direction, and the like.

Based on the above self-position information, the reference path to be traveled, the obstacle information, such as types of obstacles that have been detected (the mobile obstacles: an animal, a ball, or a leaf, the stationary obstacles: a step, a pole, a hedge, or the like), a position, a shape, a speed, and the like, the path determining unit 118 determines and transmits a planning path or a planning direction and a planning speed of the autonomous mobile system 100 without consideration of problems at approaching to the approach movement generating unit 120.

In a case where a pedestrian or a bicycle (in some cases, a motor vehicle) has been detected as the mobile obstacle based on the above obstacle information, the approach movement generating unit 120 determines a target speed and a target direction or a target path of the autonomous mobile system 100 for behaving so as to be easily predicted by the mobile obstacle in order to induce the circumferences in which the movement of the mobile obstacle has been defined, and for maintaining stable and uniform circumferences so that no large change in the mutual paths is performed when passing nearby after acquiring the definition information of the movement of the mobile obstacle, in order to perform safe/secure two-way traffic or overtaking traffic by processes to be described later in a case where crossing or approach of an autonomous mobile system's path occurs with respect to the travel path of the mobile obstacle, such as a pedestrian or a bicycle.

The vehicle control unit 122 performs motion control of the vehicle based on the latest target direction and the latest target speed of the autonomous mobile system 100 that have been acquired from the approach movement generating unit 120. In particular, for example, control is performed so that a difference between a current travel direction/travel speed of the autonomous mobile system 100 and the target direction/target speed decreases. The vehicle control unit 122 includes a driving source, such as a motor or an engine, and an electronic circuit for controlling the wheels, and is capable of changing a position and a direction of the autonomous mobile system 100.

Figure 2:
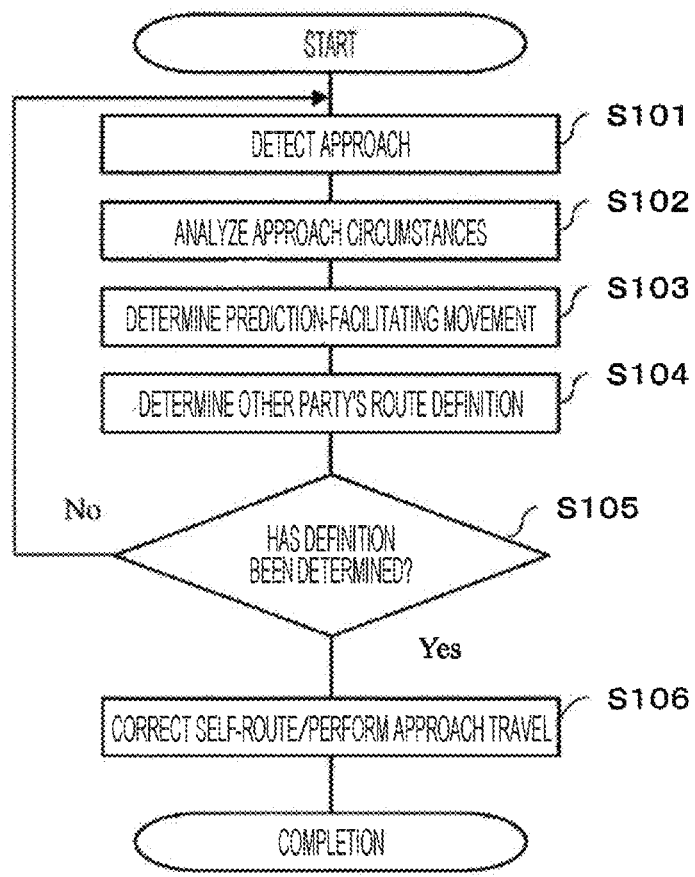
FIG. 2 is a flow chart of processing of an approach movement generating unit according to one embodiment of the present invention.

FIG. 2 is a flow chart of processing of the approach movement generating unit 120 in FIG. 1. The descriptions will be given below using reference signs. Processing of each block in the flow chart will be described in detail using FIGS. 3, 4, 5, and 6.

Figure 3:
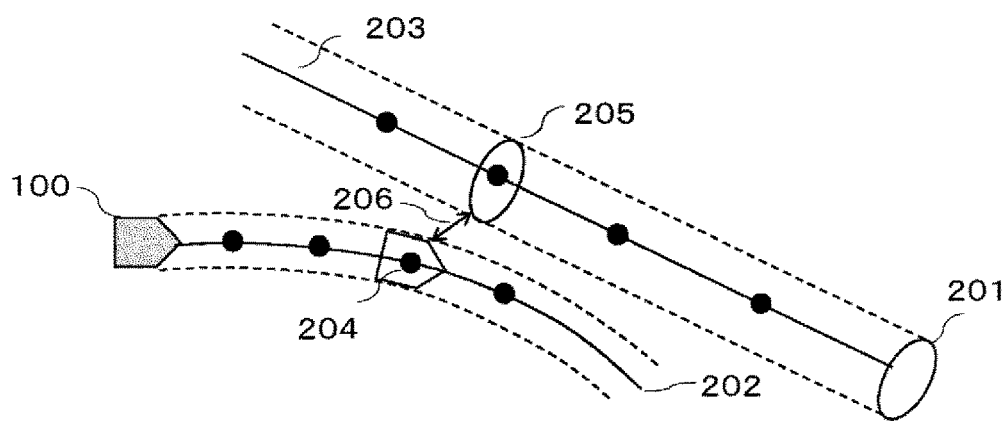
FIG. 3 is a conceptual diagram of approach-detection according to one embodiment of the present invention.

The approach movement generating unit 120 first performs approach-detection with respect to a pedestrian or a bicycle (hereinafter, referred to as a mobile obstacle) as Step 101 in FIG. 2 (hereinafter, referred to as S101). As illustrated in FIG. 3, the travel path 203 of the mobile obstacle 201 is assumed based on the obstacle information from the obstacle detecting unit 116. A case where an approach distance 206 with respect to the planning path 202 of the autonomous mobile system 100 acquired from the path determining unit 118 is a predetermined value or less, is detected. The approach distance may be approximate. The paths are given as positions at predetermined time intervals. The approach distance 206 between positions (position 204, position 205) at a certain time is calculated. In this case, a closest approach point may be acquired by interpolating positions at time intervals. The planning path 202 of the autonomous mobile system 100 has been illustrated by a curve in FIG. 3. A straight line using a position, a speed, a direction as the planning path, may be used.

Figure 4:
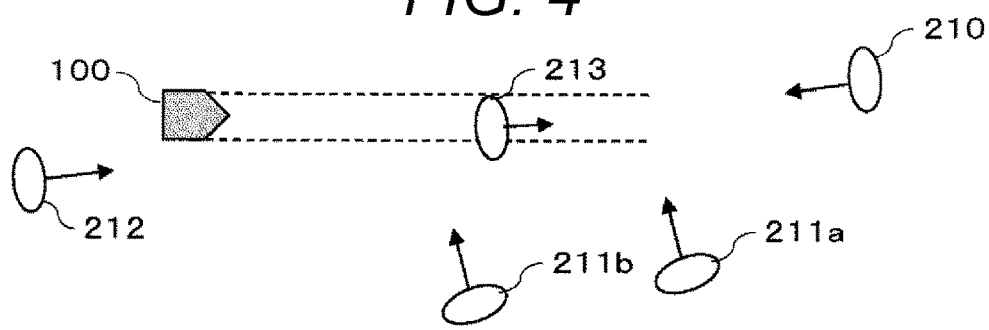
FIG. 4 is a conceptual diagram of types of approach circumstances according to one embodiment of the present invention.

Next, the approach movement generating unit 120 performs an approach-circumstances analysis with respect to the mobile obstacle as S102 in FIG. 2. As illustrated in FIG. 4, types of the approach-circumstances include facing 210, front-crossing 211a, back-crossing 211b, overtaking 212, and catching-up 213, depending on a travel direction and a travel speed of the mobile obstacle.

Figure 5A:
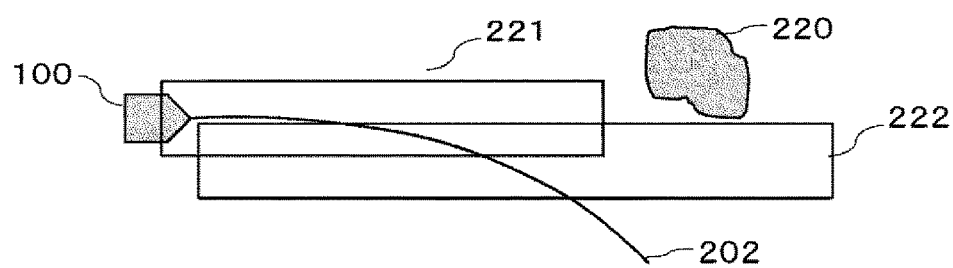
FIGS. 5A and 5B are a conceptual diagram of a prediction-facilitating movement according to one embodiment of the present invention.
Figure 5B:
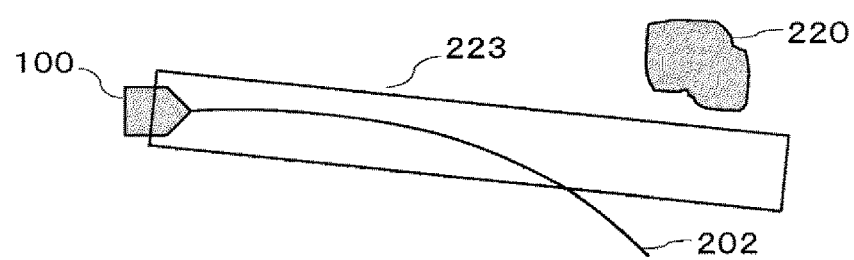

Next, as S103 in FIG. 2, the approach movement generating unit 120 determines a prediction-facilitating movement for inducing the mobile obstacle to easily predict the movement of the autonomous mobile system 100. As illustrated in FIG. 5, sections (221 to 223) each in which the prediction-facilitating movement is performed, are set with respect to the current planning path 202. As the movement based on the target path or the target direction, linearly traveling is preferable in the sections in order to induce the mobile obstacle to more easily predict the movement of the autonomous mobile system 100. In FIG. 5, the sections have been illustrated by rectangles. The target path or the section including a gentle and constant curvature or a following-road including a gentle change along a boundary of a sidewalk, may be provided. Lengths of the sections are determined by presence of an obstacle 220, the closest approach position, or the like. The autonomous mobile system 100 determines the target speed in response to sizes of the sections, the travel speed of the mobile obstacle, the above approach-circumstances.

Determination of the sections is selected in response to current approach-circumstances. For example, in a case where the mobile obstacle is present ahead and a change in a travel direction involves danger, the section 221 is selected and the autonomous mobile system 100 decelerates or stops in response to the length of the section. In a case where a slight change in a travel direction is required, the section 222 parallel to the current planning direction, is selected. In a case where a large change-direction is required in a change in a travel direction, the section 223 having a slight angle change with respect to the current planning direction, may be selected. Note that, the angle change is performed for a short time so as to be small in order to induce the mobile obstacle to easily predict the movement of the autonomous mobile system.

Selection of the prediction-facilitating movement is weighted in response to the above approach circumstances. In a case of the facing 210, in order to define whether the mobile obstacle travels to the left side or the right side of the autonomous mobile system 100, a deceleration movement is performed for inducing a change in the travel path of the mobile obstacle, and the section 222, parallel to the current planning direction, for shifting a path axis with respect to the facing mobile obstacle, is selected.

In a case of the above front-crossing 211a, a deceleration for accelerating definition of the circumstances is performed. In a case of the back-crossing 211b, a forward movement without the deceleration for accelerating the definition of the circumstances, is performed. In a case of the overtaking 212, a deceleration and a stop for giving a path are performed and the parallel section 222 is selected. In a case of the catching-up 213, a section parallel to the travel direction of the mobile obstacle is highly weighted in order not to give an effect to a movement of the mobile obstacle after overtaking. In a case where the prediction-facilitating movement has been already performed and an approach movement to be described later has been already performed, and in a case where a plurality of mobile obstacles is present, a severe condition is selected with respect to the mobile obstacles.

Note that the above determination of the prediction-facilitating movement is one embodiment for solving the problems according to the present invention. If the movement of the autonomous mobile system 100 is easily predicted, a method including the above following-road travel, slight speed change, and slight change in a travel direction combined, may be provided.

Next, as S104 in FIG. 2, the approach movement generating unit 120 performs definition-determination of the mobile obstacle's travel path. Here, in a case where the latest travel circumstances of the mobile obstacle have a constant and linear movement-section, the travel path is definition-determined as the mobile obstacle's path. The defined path may not be a perfect straight line, and is detected by entering in a rectangular region in which a traveled locus of the mobile obstacle has a certain width and length. In a manner similar to the defined path, it is determined that a speed of the mobile obstacle has been defined when a variation is a predetermined value or less during the latest certain period. In a case where the definition-determination cannot be performed even when a predetermined period has passed while approach circumstances vary, determination is performed at S105 in FIG. 2, so that the processing goes back to the approach-detection S101 and new processing is performed under the latest circumstances.

The approach movement generating unit 120 finally performs a correction of the target path and the approach travel of the autonomous mobile system 100 so that the defined path of the mobile obstacle is not prevented as S106 in FIG. 2 in a case where it is determined that the travel path of the mobile obstacle has been defined at S105.

Figure 6:
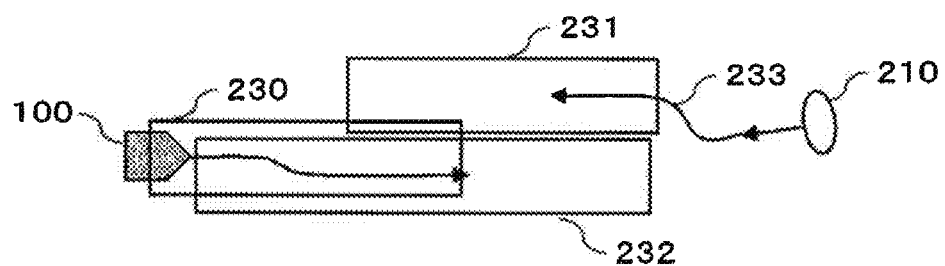
FIG. 6 is a conceptual diagram of a path correction and approach travel according to one embodiment of the present invention.

As illustrated in FIG. 6, in a case where the autonomous mobile system 100 travels over the above prediction-facilitating movement section 230, induces path definition of the facing 210 of the mobile obstacle, and definition-determines the defined path in the region 231 under the latest travel circumstances of the traveled locus 233 of the mobile obstacle, the autonomous mobile system 100 promptly and slightly corrects the target path in the section 230, and travels over a corrected target path in the corrected section 232 for performing safe/secure two-way traffic. Here, the two-way traffic has been illustrated in FIG. 6. The same is true of other circumstances, such as the overtaking or the crossing. Accordingly, in a case where the mobile obstacle is approached, since the mutual movements have been defined, safe/secure traffic can be performed.

Finally, in a case where a sequence of the approach movement illustrated in FIG. 2 has been completed and a mobile obstacle has not been detected by the obstacle detecting unit 116, the approach movement generating unit 120 transmits the planning path or the planning direction and the planning speed that have been generated by the path determining unit 118, to the vehicle control unit 122.

REFERENCE SIGNS LIST 100 autonomous mobile system
110 storage information processing unit
112 environment information acquisition unit
114 self-position estimation unit
116 obstacle detecting unit
118 path determining unit
120 approach movement generating unit
122 vehicle control unit

The invention claimed is:
1. An autonomous mobile system configured to autonomously move based on a reference path of the autonomous mobile system in an environment in which a mobile obstacle that moves in a free direction is present, the autonomous mobile system comprising:
  an environment information acquisition unit provided with sensors equipped in the autonomous mobile system and configured to acquire environment information of the autonomous mobile system by the sensors;
  a storage information processing unit configured to retain reference path information or geographic information in which the reference path and a periphery information of the reference path has been registered;
  a self-position estimation unit configured to estimate a current self-position of the autonomous mobile system based on the environment information and the reference path information or the geographic information;
  an obstacle information generating unit configured to generate obstacle information about the mobile obstacle, based on the environment information obtained by the sensors;
  a path determining unit configured to determine a planning path or a planning direction, and determine a planning speed, of the autonomous mobile system at a current time based on the current self-position, the obstacle information, and the reference path information;
  an approach movement generating unit configured to determine an expected path of the mobile obstacle based on the obstacle information, and in a case in which an interval between the expected path of the mobile obstacle and the planning path that is a predetermined value or less is detected, generate a target path or a target direction and generate a target speed of the autonomous mobile system, for inducing stable approach circumstances in which mutual movements have been previously defined, based on the obstacle information, and the planning path or the planning direction; and
  a vehicle control unit configured to control the movement of the autonomous mobile system based on the target direction and the target speed of the autonomous mobile system, wherein the approach movement generating unit detects approach of the mobile obstacle and the autonomous mobile system toward each other, determines types of approach circumstances that include traveling in opposite directions based on the obstacle information of the mobile obstacle, the current self-position of the autonomous mobile system, and the planning path, performs a prediction-facilitating movement of the autonomous mobile system that has no change or a constant change of the target path or the target direction, and no change or a constant change of the target speed of the autonomous mobile system, determines a travel path of the mobile obstacle during a certain period during the prediction-facilitating movement, and if necessary to confirm the stable approach circumstances between the autonomous mobile system and the mobile obstacle, corrects the target path or the target direction, and the target speed of the autonomous mobile system so that the autonomous mobile system is able to reduce a likelihood of a collision with the mobile obstacle, and wherein the types of approach circumstances include the traveling in opposite directions, front-crossing, back-crossing, overtaking, and catching-up, and the approach movement generating unit weights selection of the target speed of the autonomous mobile system when the type of the approach circumstances is one of the traveling in opposite directions, the front-crossing, the back-crossing, and the overtaking, and the approach movement generating unit weights selection of the target path of the autonomous mobile system when the type of the approach circumstances is the traveling in opposite directions, the overtaking, and the catching-up.

2. The autonomous mobile system according to claim 1, wherein the approach movement generating unit uses the prediction-facilitating movement to generate a rectangular section in which the target path of the autonomous mobile system is generated and the target speed of the autonomous mobile system based on the environment information, an approach position of the mobile obstacle, and the types of approach circumstances, and the autonomous mobile system travels at a constant speed in the generated rectangular section, wherein a length of the generated rectangular section is determined by a location of the mobile obstacle, and the target speed of the autonomous mobile system is determined based, in part, on a size of the generated rectangular section.

3. The autonomous mobile system according to claim 1, wherein types of the mobile obstacle include a pedestrian and a bicycle, and the obstacle information generating unit generates identifiable information of the types of the mobile obstacle, and the approach movement generating unit performs its process only when the approach movement generating unit detects an identification of the pedestrian or the bicycle.

4. The autonomous mobile system according to claim 1, wherein the approach movement generating unit performs the prediction-facilitating movement of the autonomous mobile system based on the obstacle information obtained by the sensors.

* * * * *